(12) United States Patent
Spilo et al.

(10) Patent No.: US 6,208,999 B1
(45) Date of Patent: Mar. 27, 2001

(54) RECOVERABLE COMPUTER FILE SYSTEM WITH A SIGNATURE AREA CONTAINING FILE INTEGRITY INFORMATION LOCATED IN THE STORAGE BLOCKS

(75) Inventors: Michael L. Spilo; Jonathan A. Daub, both of New York, NY (US)

(73) Assignee: Network Associates, Inc., Santa Clara, CA (US)

( * ) Notice: Subject to any disclaimer, the term of this patent is extended or adjusted under 35 U.S.C. 154(b) by 0 days.

(21) Appl. No.: 08/764,309

(22) Filed: Dec. 12, 1996

(51) Int. Cl.$^7$ .................................................. G06F 17/30
(52) U.S. Cl. ........................................... 707/202; 707/205
(58) Field of Search .................................... 707/202, 205; 395/182.13, 182.18

(56) References Cited

U.S. PATENT DOCUMENTS

| | | | |
|---|---|---|---|
| 4,941,059 | * 7/1990 | Grant | 711/156 |
| 5,083,264 | 1/1992 | Platteter et al. | |
| 5,488,702 | * 1/1996 | Byers et al. | 395/186 |
| 5,675,767 | * 10/1997 | Baird et al. | 711/156 |

OTHER PUBLICATIONS

IBM Technical Disclosure Bulletin, 39(1):263–264, Jan. 1, 1996.

* cited by examiner

*Primary Examiner*—Thomas Black
*Assistant Examiner*—John C. Loomis
(74) *Attorney, Agent, or Firm*—Darby & Darby

(57) ABSTRACT

A file system for data file storage on a block storage device includes signature information embedded within each block allocated to a data file. Such signature information includes a file identification number, a sequence number within the file, and optional file type information. The signature information is used to reconstruct files on the block storage device in the event of damage to data files or critical system areas on the device. The directory structure for the file system is maintained as a self-contained flat database, stored as a B-tree for expedited searching, including full hierarchical pathnames for each directory entry, thereby enhancing the ability to recover files in a low level of the directory hierarchy when a middle level has been damaged.

27 Claims, 10 Drawing Sheets

RECOVERABLE COMPUTER FILE SYSTEM WITH A SIGNATURE AREA CONTAINING FILE INTEGRITY INFORMATION LOCATED IN THE STORAGE BLOCKS

The invention relates to a method and system for data image and retrieval on digital computer devices, and more particularly to a file system for block storage devices whereby certain data errors can be corrected and lost or damaged data can be recovered.

BACKGROUND OF THE INVENTION

Block storage devices, such as disk drives and tape drives, are commonly used for storage of computer data.

Block storage devices typically store information in evenly-sized portions, or "blocks." If a data file is smaller than a single block, then a whole block is used to store the data, and the remainder of the block is unused. If a data file is larger than a block, then two or more blocks, which often are not contiguous, can be used to store the data. Again, blocks containing unused space are often allocated to a file in this storage scheme. Block storage devices typically use a writable medium, such as a magnetic or optical medium, to store the computer data, although other forms of electronic memory can also be used.

A single disk or tape device usually has a capacity of many blocks, often into the millions, allowing many data files to be stored. In order to make access to files stored on a block storage device more efficient, these files can be organized into groups known as "directories." In this way, data files having similar content, usage, or characteristics can be grouped together for a user's convenience. Directories are actually data files that contain information specifying where data files are stored on the block storage device. They can often be hierarchical; in other words, directory files can point to other directory files, which in turn point to data files. The location of a file within a directory hierarchy can be specified by means of a "pathname" to the file, which indicates the name of each directory traversed as well as the filename.

In addition to data files and directory files, block storage devices usually contain a small amount of additional information in a "system area." This additional information specifies, among other things, what space on the device is used and what is available for use. When a computer seeks to write information to a block storage device, the system area is accessed to determine where the information can be written without overwriting other information. Similarly, when a computer seeks to read information from a block storage device, the system area is accessed to determine where the desired information was written.

In most traditional file systems, the system area and directories are overhead. That is, the data contained there has essentially no intrinsic value; it is used to track the location of data on the block storage device. Accordingly, it is useful to minimize the impact of the system information on storage capacity. Traditional file systems often have system overhead in the range of 2–3% of capacity. In other words, 2–3% of a given block storage device is devoted to system data, directories, and other information, and is unavailable for use in data storage.

Although the above characterizations of how data is stored on block storage devices are generally true, it should be recognized that a number of specific formats for utilizing the foregoing data types are presently known and used, as will be discussed in detail below.

The data stored on a block storage device can be damaged in a number of ways. An errant computer program can accidentally write information to one or more previously allocated blocks. A power aberration can cause a write operation to be only partially completed, or can cause a computer to write inaccurate data. Moreover, mechanical or electronic failure of a block storage device is possible. Magnetic storage devices are particularly susceptible to environmental factors, such as temperature and electromagnetic fields.

While certain known steps can be taken to prevent many causes of failure, some errors are considered to be inevitable. Accordingly, a need exists to be able to repair damage when it occurs.

One format for the storage of data on block storage devices is known as the "FAT" ("File Allocation Table") file system. The best-known implementation of a FAT system is used on PC-compatible computers by Microsoft MS-DOS and Microsoft Windows 95, although other computers and operating systems use similar systems. On a disk using the FAT file system, the system area contains a "root," or highest level directory containing information on other directories and data files on the disk. The root directory can have a number of directory entries, each of which contains information on a single directory or data file, including its name and a number corresponding to where the file begins on the disk. Each individual block on the disk has a unique identification number for this purpose.

The system area of a FAT disk also includes a file allocation table, which is an array of block numbers or "pointers" to locations on the disk holding data belonging to data files. The file allocation table has one entry, capable of holding a number, for each block on the disk. If the block corresponding to an entry in the file allocation table is not allocated to any directory or data file, then the entry contains a unique numeric identifier specifying that condition. If the block is allocated, then the entry contains a number specifying which block is the next one to store a successive portion of the file in question. If no more blocks are needed to store the file, another unique numeric identifier is used to specify that condition.

Accordingly, under the FAT file system, files need not be stored in consecutive blocks on the disk. Consider, as an example, a disk having 10,000 blocks and one desired file, two blocks long. Assume that the first portion of the file is stored in block number 2,395 and the second portion is stored in block number 6,911. A computer desiring to access that file will first check the root directory in the system area of the disk. If it finds the name of the desired file, it will check the number in the root directory entry corresponding to the start of the file. In the present example, that number will be 2,395. Consequently, the computer will access the first part of the file from block number 2,395.

The computer will then access the file allocation table. In entry number 2,395 of the table, the number 6,911 will be stored, indicating that the file continues in block number 6,911, and does not end after the first block. The computer can then retrieve the second part of the file from block number 6,911. The computer will then access the file allocation table again. Entry number 6,911 of the file allocation table will contain a number such as 65,535, indicating that the end of the file has been reached. Since there are only 10,000 blocks on the exemplary disk, it is not possible for data to be stored in block number 65,535.

The foregoing scheme is used for each data file and directory file on the disk. Blocks that are unused can have corresponding file allocation table entries of zero, for example.

As a result, it is apparent that the FAT system is vulnerable to damage. If the file allocation table is damaged, directories should still point to the first block of each file, but remaining portions of the files may be lost. If the file allocation table contains incorrect information, retrieved data files might contain data that in fact belongs to a different file, a phenomenon known as "crosslinking." If the root directory or directory files are damaged, the file allocation table should still contain correct information, and the presence of files on the disk can in principle be ascertained, but there would be no way to determine their names and directories.

Furthermore, because of the hierarchical nature of the directories, it should be noted that damage to an intermediate-level directory can result in the loss of all files in lower level directories.

Another file system is known as "HPFS," the "High Performance File System." HPFS was originated by Microsoft and adopted by IBM for use with the OS/2 operating system for PC-compatible computers. HPFS does not use a file allocation table to indicate how files are linked together. Rather, each directory entry points to an "Fnode," or "File node," which contains a list of blocks used by the file. The Fnode also contains the filename for the file. Information on whether or not disk space is allocated is maintained in "bitmaps," small data structures which reflect only whether blocks are in use, and not any information on how particular files are allocated. Accordingly, under HPFS, file allocation information is spread throughout the disk, rather than being stored in a single system area.

HPFS is therefore somewhat more resistant to damage than the FAT system. Any damage to the space allocation bitmaps can be corrected by scanning the disk for Fnodes and files. Damage to a particular directory entry can sometimes be corrected by scanning the disk for Fnodes and reconnecting them to the damaged directory, using the filenames stored in the Fnodes. However, damage to one or more Fnodes can render data files essentially unrecoverable, since there would be no way to determine what blocks belong to which file, and in what order. Moreover, if the root directory or other system areas are damaged, use of the entire disk can be lost.

Microsoft also originated "NTFS," or "New Technology File System," as a successor to HPFS and FAT. NTFS is now supported by Microsoft Windows NT, which runs on PC-compatible and certain other computers. NTFS is similar to HPFS in that file allocation information is not stored in a central file allocation table. However, a Master File Table is used to store system information, root directory information, and small files and subdirectories. Lists of blocks used by larger files and directories are kept with the corresponding directory information, whenever possible.

Consequently, damage to the Master File Table or subdirectories can result in unrecoverable files, since there would be no way to associate data found on the disk with any particular directory. NTFS maintains a backup copy of the first 16 files in the Master File Table, with redundant information, to help alleviate this problem. However, an errant software process can damage both copies of the Master File Table.

Numerous other file systems exist for various types of computers and operating systems. The foregoing discussion of FAT, HPFS, and NTFS is intended to be representative, showing certain drawbacks of common file systems.

Several known methods exist for protecting data from loss or damage resulting from the designs discussed above.

For example, copies of critical data can be made on a second block storage device. This process is known as "backing up" the data. Such backup copies can be made at periodic intervals (like a "snapshot" of the disk) or concurrently (called "mirroring") as data is written to the disk (as in "RAID" redundant disk arrays). However, periodic backups can be tedious, interfering with regular use of the computer for a period of time while the backup is occurring, and requiring user intervention to insert backup media. Periodic backups might also "miss" important data, if a backup is scheduled to occur only after the data has been created and already lost due to a failure. Concurrent backups have the disadvantage that damage caused by an errant software program can damage or destroy the backup copy of the information as well as the original.

A second approach to data protection is found in the "IMAGE" or "MIRROR" program found with Microsoft MS-DOS. With this approach, backup copies of certain critical data structures from the system area are kept in a separate area of the block storage device. Accordingly, if damage occurs to the original structures, the copies can be used to retrieve data from the device. However, this approach has the same disadvantages as full backups. Concurrent mirroring is susceptible to software problems and can degrade performance (as certain data must be written twice), and periodic mirroring can be out-of-date when damage occurs. Moreover, if the location of the image data is not ascertainable (or is not fixed in a known position on the storage device), the image file is useless in repairing a damaged volume.

Accordingly, as indicated above, a need exists for a file system for block storage devices having enhanced capabilities for data recovery in the event of damage to various areas on the storage device. Such a file system must be robust and convenient, and should not significantly degrade system performance.

SUMMARY OF THE INVENTION

The file system of the invention addresses the disadvantages of traditional file systems and file protection means.

The file system of the invention includes file identification information with file data, thereby enhancing prospects for file recovery in the event of file system damage. Moreover, the entire directory structure for the storage device, including all subdirectories, is maintained in a single data structure. If this data structure is damaged, it can be completely recreated from information recovered from other areas of the storage device.

Space is reserved within each block corresponding to a data file for a small signature area. The signature area contains a unique bit pattern, specifying that the signature area is not part of the file data, a file identification number, uniquely identifying the block as belonging to a particular data file, and a sequence number, which indicates the order in which the file's blocks belong within the file. The foregoing data structures are maintained by the file system of the invention so as to be transparent to the user.

Moreover, in an embodiment of the invention, a single directory structure is used for the entire file system; subdirectories need not be stored separately. The directory structure is also marked with the signature areas indicated above. Each directory entry within the directory structure contains the entire pathname to a data file. Accordingly, a hierarchical structure, such as a FAT system, is simulated by the invention. In a preferred embodiment, the invention is compatible with and is used in conjunction with a hierarchical file system, such as FAT or NTFS.

The present invention is improved over traditional file systems in the area of data recovery. File allocation information can be dynamically maintained and can be reconstructed in cases of loss or damage by scanning the disk for blocks having identification and sequence numbers, and rebuilding the files accordingly. If part of a data file is damaged, the remainder of the file can be retrieved by way of the identification and sequence numbers. If the directory structure is damaged, the disk can be scanned to find missing files. The simulated directory hierarchy will not be lost, even if a "middle level" of the simulated hierarchy is damaged, since the full pathname for each file is stored in every directory entry.

Although the directory structure is maintained as a "flat" database, without separate subdirectories, it is structured internally as a balanced tree structure to expedite file searching. Only a small portion of each data file block is devoted to the information used to recreate the file and directory structures. It has been found that an implementation of this file system can be made which uses only 6–7% overhead, compared to the 2–3% overhead consumed by traditional file systems. The overhead can be reduced further by protecting only certain critical files. This small increase in overhead, given the large storage devices now available, is more than offset by the improved data protection the invention provides.

DETAILED DESCRIPTION OF THE INVENTION

The invention is described below, with reference to detailed illustrative embodiments. It will be apparent that a system according to the invention may be embodied in a wide variety of forms. Consequently, the specific structural and functional details disclosed herein are representative and do not limit the scope of the invention.

Figure 1:
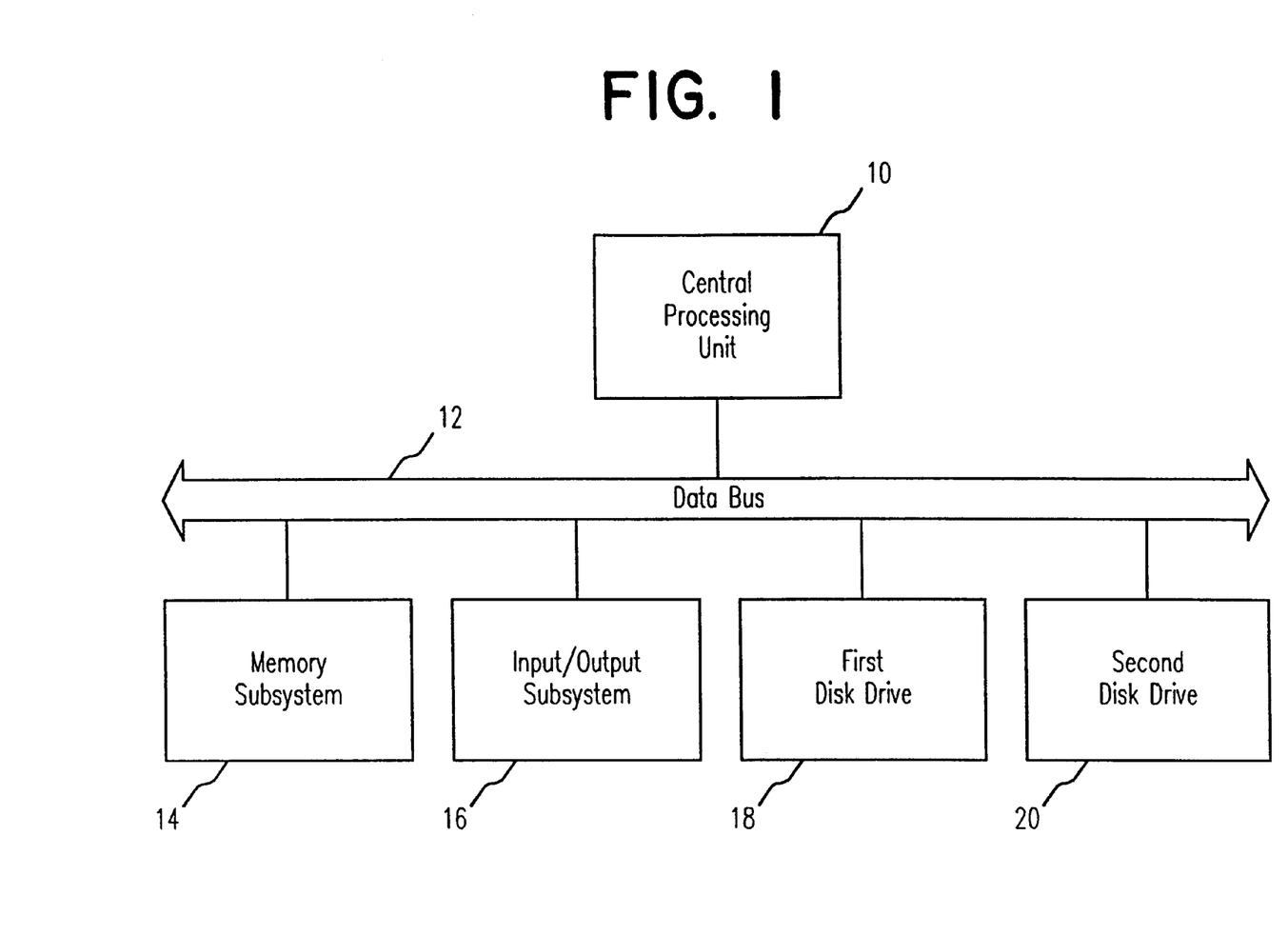
FIG. 1 is a simplified block diagram of a typical computer system for use in conjunction with the present invention.

Referring initially to FIG. 1, a simplified block diagram of a typical computer system is shown. A central processing unit 10, or CPU, is coupled to a data bus 12. As is well known in the art, the CPU 10 performs substantially all data processing functions. Also coupled to the data bus 12 is a memory subsystem 14, which is typically comprised of random access memory ("RAM") utilized for transient data storage while the computer system S is in use. An input/output subsystem 16 is coupled to the data bus 12 for interaction with a user or other means of control. The exemplary computer system has two block storage devices: a first disk drive 18 and a second disk drive 20.

In operation, the computer system S receives control signals through the input/output subsystem 16. By way of the control signals, the CPU 10 is prompted to execute a program, which may process, transfer, or otherwise interact with data taken from the memory subsystem 14 or either of the disk drives 18 and 20. Among other operations, the CPU 10 can be instructed to search for a file on a disk drive, create a file on a disk drive, create a directory on a disk drive, delete a file on a disk drive, append to an existing file on a disk drive, truncate an existing file on a disk drive, and modify an existing file on a disk drive. As discussed above, it should be recognized that most of these operations include the transfer of data either from the memory 14 to a disk drive 18 or 20, or from a disk drive 18 or 20 to the memory 14. In accordance with the invention, the CPU 10 can also be instructed to check for and attempt to repair damage on a disk drive. Most traditional file systems accommodate some form of error recovery, but the invention does so in a unique and improved manner.

Figure 2:
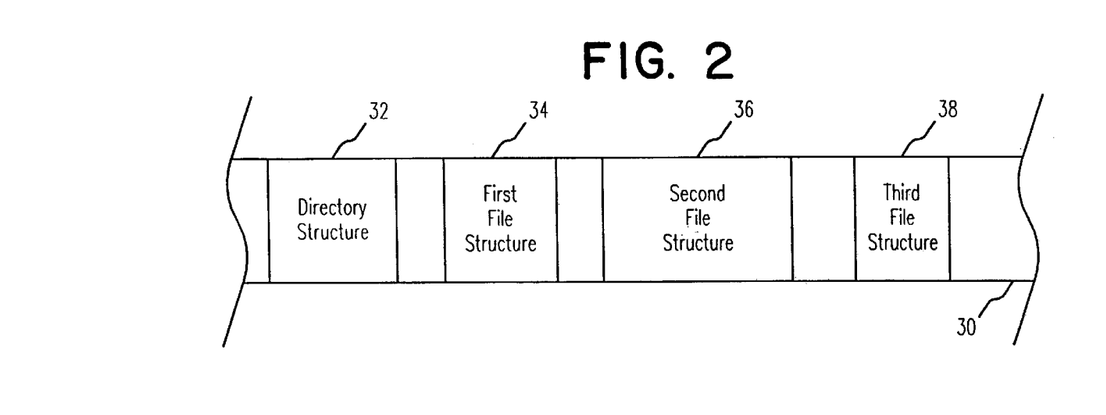
FIG. 2 shows the data structures present on a block storage device utilizing the present invention.

A non-hierarchical data storage format is used by the file system of an embodiment of the invention. Data structures typically used on a block storage device, such as the disk drive 18, utilizing this file system are shown in FIG. 2. The entire storage capacity of the disk drive 18 subject to the present file system is shown as a file storage area 30.

As will be discussed in further detail below, the file storage area 30 shown in FIG. 2 may encompass the entire storage capacity of the disk drive 18, or it may represent only a small portion of the capacity of the disk drive 18, while the remainder of the disk drive 18 utilizes some other file system, such as those previously discussed. This can be accommodated in several ways. First, the disk drive 18 can be "partitioned" into separate logical disk drives, a technique that is well known in the art. Second, a relatively large "container file" can be permanently preallocated using a traditional file system. The space within the container file can then be managed by way of the file system of the invention, and can be treated as a separate virtual disk drive. This technique is also well known, and is implemented by such programs as Microsoft's DoubleSpace and Stac's Stacker disk compression tools. Third, the two file systems may share a single disk drive. Files subject to the invention can contain a unique "signature," distinguishable by software used to implement the invention. If the entire disk drive 18 utilizes the invention, then other disk drives, such as the disk drive 20, need not.

The file storage area 30 includes two types of data structures: a directory structure 32 and multiple file structures. The file structures are represented in FIG. 2 by a first file structure 34, a second file structure 36, and a third file structure 38. Although a hierarchical directory tree structure is contemplated and simulated by the invention, only one directory structure 32 is needed. The directory structure 32 is provided as a flat database having one entry corresponding to each file within the file storage area 30. Each database entry contains information on the full hierarchical path of each file.

In FIG. 2, the directory structure 32 and the file structures 34, 36, and 38 are shown to be in different physical portions of the file storage area 30. It should be noted that the various data structures are separated logically only, and physically may overlap. That is, portions of the directory structure 32 may be interleaved with portions of the file structures 34, 36, and 38, and portions of a single file structure (34, 36, or 38) may be interleaved with portions of another file structure (34, 36, or 38).

Figure 3:
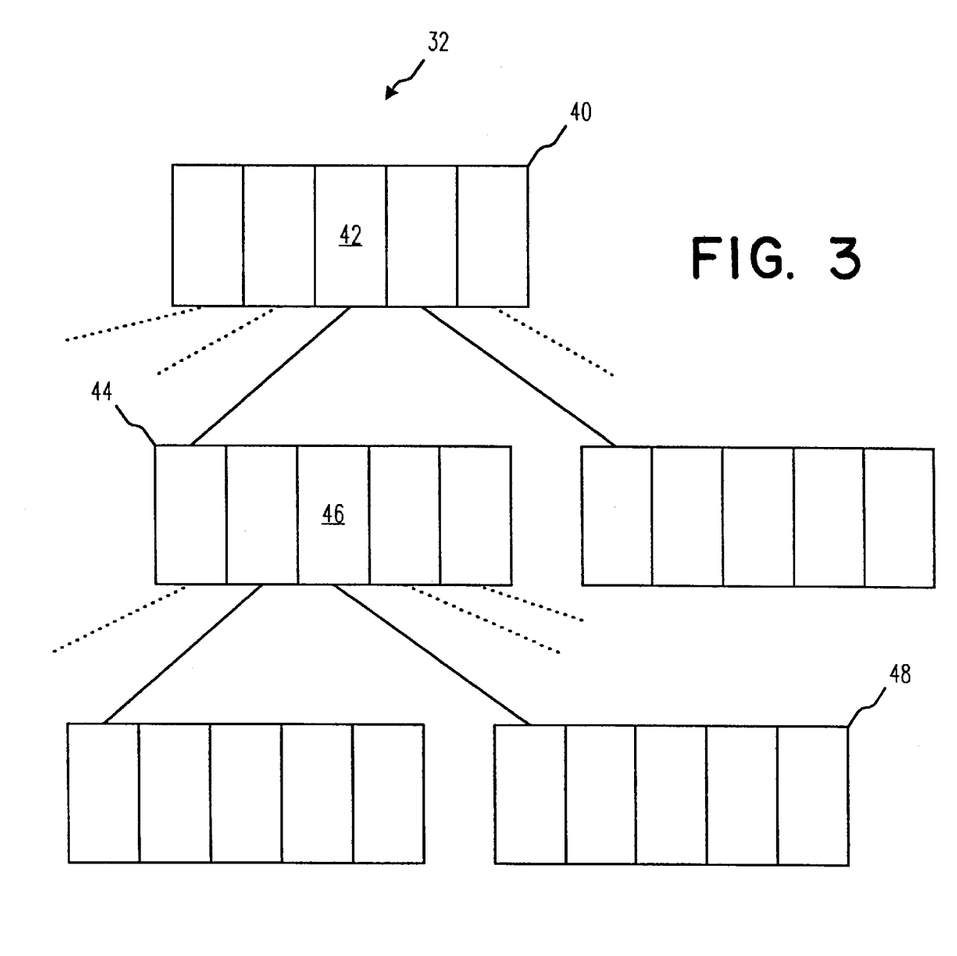
FIG. 3 is a diagram showing the organization of the directory structure of the file system.

The directory structure 32, which is shown in detail in FIG. 3, is structured as a binary tree ("B–tree") structure of directory entries. While certain traditional file systems, such as the FAT system discussed above, use linear search techniques to locate a desired file, the present file system preferably uses a B–tree to expedite file location. Each "node" of the B–tree can have a varying number of branches, dependent on the length of the directory records, and consequently, on the number of directory records that can be stored in each directory block. In essence, if the desired directory entry is not found in the first directory block, the B–tree is traversed (i.e. the proper lower branches are searched). Accordingly, the directory structure is successively subdivided until the proper file is found. This technique is well known. See, e.g., Duncan, "Design Goals and Implementation of the new High Performance File System," *Microsoft Systems Journal*, v. 4, n. 5, pp. 1–13 (Sep. 1989). Consequently, even when an extremely large number of files are stored within the file storage area 30 and represented within the flat directory structure 32, a search can be extremely fast.

It should be noted that the directory structure 32 is given a B–tree structure to expedite searches only. No directory hierarchy is implied by the tree structure. Rather, the directory structure is a fully self-contained flat database of files, wherein each directory entry specifies the entire pathname to a file. A directory hierarchy is simulated by virtually grouping those files having identical pathname prefixes, but different filenames.

In an embodiment using a B–tree approach, a top directory block 40 contains a directory entry sorted so as to be a "key" into the remainder of the directory structure 32 (FIG. 2). If the desired file is alphanumerically less or greater than the top level key, then a nearest directory entry 42 contains links to two second-level directory entries 44, which may then be compared. Similarly, a directory entry 46 in the second-level directory block 44 may point to a third-level directory block 48, and so on, until the desired file is found. It should be noted that the B–tree as contemplated by the present invention is balanced, or substantially symmetric. If any branch of the B–tree structure is longer than the others, then the key directory entries in the higher-level directory blocks can be redistributed to regain balance. This technique is well known in the art of computer programming, and it will be appreciated that a "B+tree" can also be used.

Each directory entry, for example the directory entry 46 in the second level directory block 44, contains the full pathname of the specified file, the allocation run(s) for the file, a pointer to a lower-level directory block (if one exists), and various other information present in traditional file systems (such as file creation date and time, file attributes, etc.). Maintaining the full pathname for each file in each directory entry is an important feature for improved data recovery, as set forth in detail below.

Figure 4:
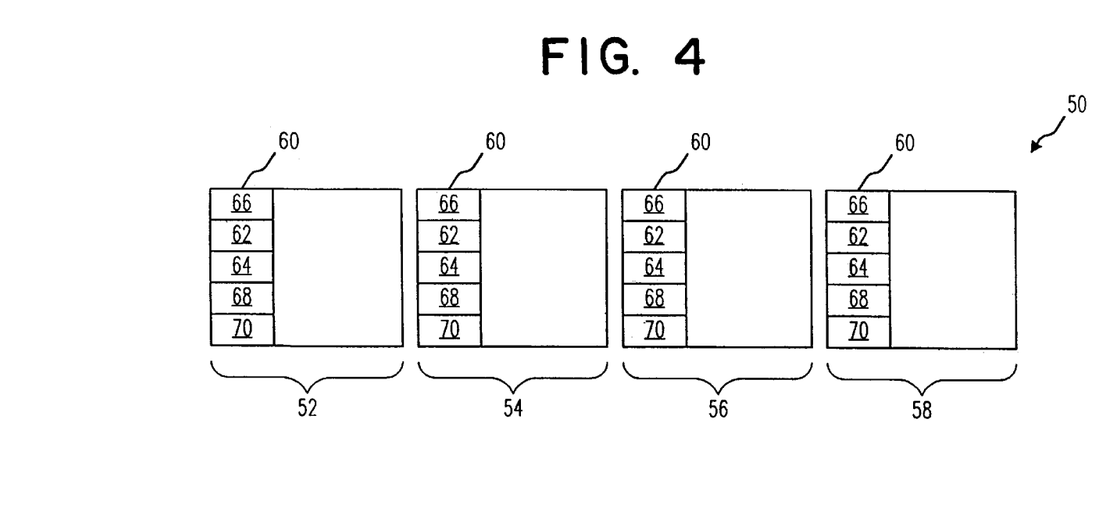
FIG. 4 illustrates the structure of an exemplary data file for use with the file system.

The structure of an exemplary file is shown in FIG. 4. As previously discussed, each block of each file has associated therewith and stored therein at least a file identification number and a file sequence number. Given an exemplary block size of 512 bytes, one embodiment of the present invention reserves 16 bytes for the foregoing information. The remaining 496 bytes of each block can be used to store the data file. This results in an overhead of approximately 3% for each data file utilizing the file system.

The file identification and file sequence numbers can be implemented as follows. Every file is assigned a unique file identification number, based on its location within the directory structure discussed above. If there are 100 files using the file system, then file identification numbers 1–100 can be used. It should be understood that this is only one of numerous possible methods for allocating file identification numbers; other possibilities include pseudorandom number generation (ensuring that numbers are not re-used), a number generated based on the filename, a number generated based on the date and time of file creation, or a sequential number unrelated to any position within the directory structure. If the file identification number is not related to a file's position within the directory structure, then the file identification number should be stored within the file's directory entry, as discussed above.

FIG. 4 shows a file 50 using four allocation blocks, a first block 52, a second block 54, a third block 56, and a fourth block 58. Each allocation block has a signature area 60. As indicated, a file identification number 62 is stored within each signature area 60.

Each allocation block within a single file (as in the illustrated file 50) also has a unique sequence number 64. For example, file 50 is four blocks in length, so the number 1 will be stored as the sequence number within the signature area 60 of the first block 52, the number 2 will be stored within the signature area 60 of the second block 54, the number 3 will be stored within the third block 56, and the number 4 will be stored within the fourth block 58.

These sequence numbers 64 assist in the recreation of files for which important information has been lost. If the directory structure or other system area of the disk is damaged, the file can be recreated by scanning the disk and finding all allocation blocks having the same file identification number 62, and piecing them together in the order specified by the sequence numbers 64. It is observed that the sequence numbers provide for the possibility that a file's blocks may be stored out of sequence on the disk. If one or more allocation blocks has been damaged, erased, or is otherwise lost, that situation will be evident from the missing sequence numbers.

Each signature area 60 also has room for a unique bit pattern 66. This unique bit pattern 66 is used to identify those files that are associated with the file system. This bit pattern should be one that is unlikely to occur at the beginning of a data block, and should preferably be followed by the other identifying information, the order of which is not critical.

The invention optionally accommodates a file type code 68 within each signature area 60. Under traditional file systems for PC-compatible personal computers, the file type is usually indicated by a three-character suffix to the filename, such as "EXE" for executable programs, "HLP" for help files, or "TXT" for text files. If the information stored by the file system is damaged and recovered, the file type code 68 can be useful to determine the nature of the recovered file, particularly if the filename is lost. In one embodiment, the three-character file type code 68 is stored "as-is" within the signature area 60. However, it is recognized that other or more efficient encoding is possible and can readily be used. In another embodiment the entire eight character filename is stored.

Also, each signature area 60 optionally includes a checksum 70, allowing the invention to verify that the unique bit pattern 66, file identification number 62, sequence number 64, and file type code 68 are all valid.

The entire directory structure 32 (FIGS. 2 and 3) is treated by the invention as a single file. Each block of the directory structure has an associated file identification number 62 (zero, for example, can be used to indicate that the file is in fact the directory structure) and appropriate sequence numbers 64. Accordingly, if portions of the directory structure 32 are damaged, it can be partially or completely recovered as set forth in detail below.

Figure 5:
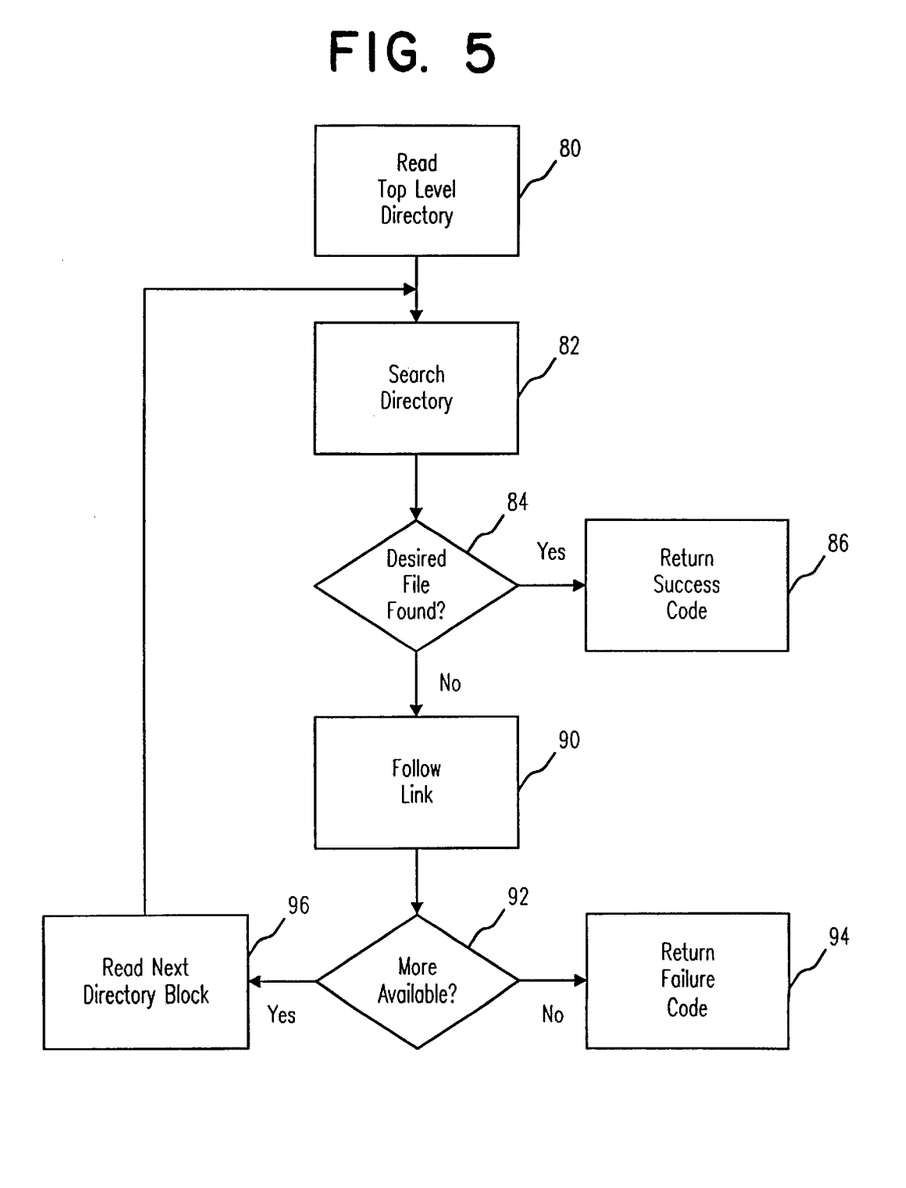
FIG. 5 is a flowchart illustrating the process followed by a file search operation according to the present invention.

A number of operations can be performed within the file system. A flowchart depicting a file search operation is shown in FIG. 5. First, the top level directory block 40 (FIG. 3) is read (step 80). The contents of the directory block are searched (step 82). If the desired file is found there (step 84), then a success code and an allocation run indicating the location of the desired file are returned (step 86). If not, then a link is followed to locate the next appropriate directory block (step 90). If no more directory blocks are available (step 92), then a failure code is returned (step 94). Otherwise, the next directory block is read (step 96), and the search repeats as above until the file is found.

Figure 6:
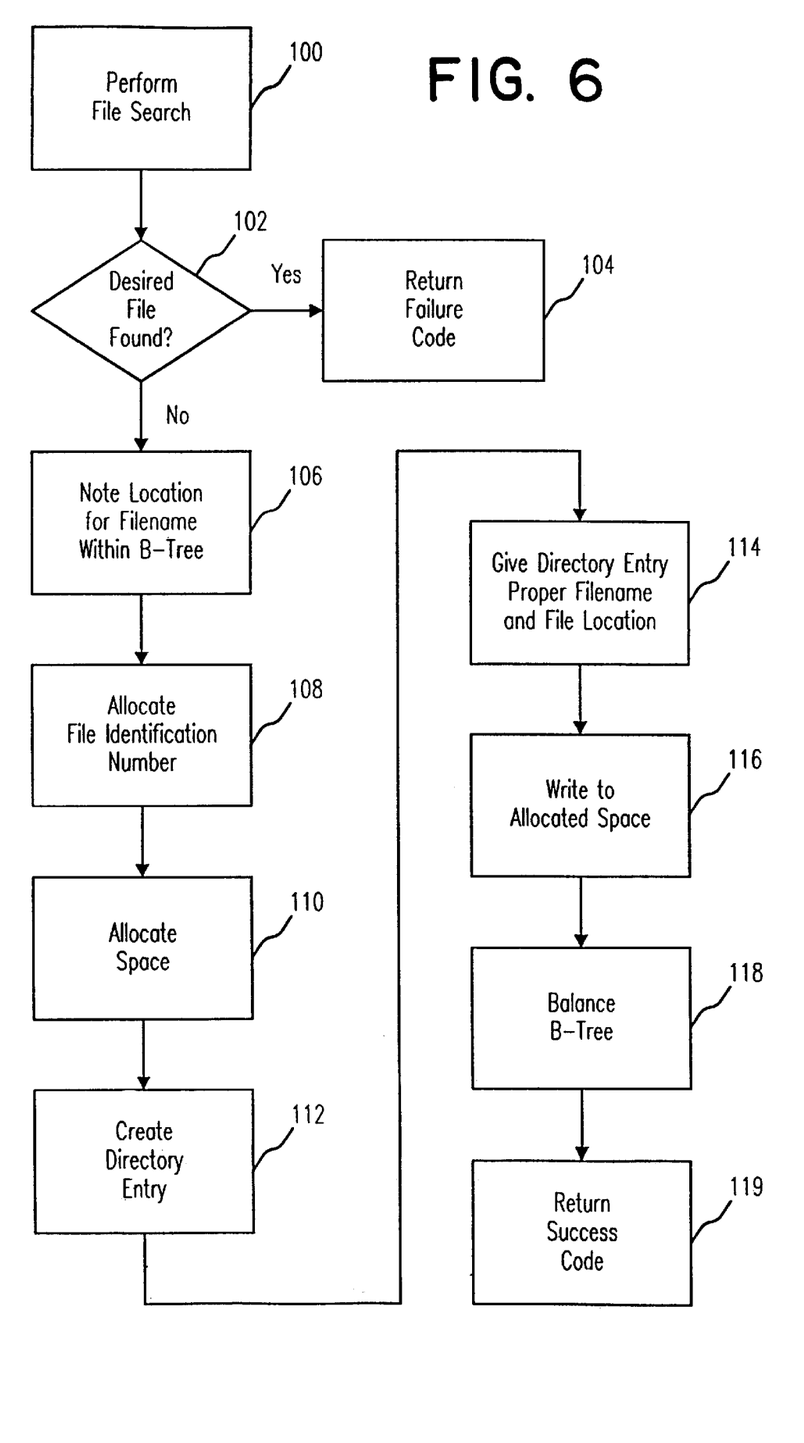
FIG. 6 is a flowchart illustrating the process followed by a file creation operation according to the present invention.

The process followed in storing a new file is shown in the flowchart of FIG. 6. First, a file search (see FIG. 5) is performed (step 100) to determine if a file having the desired name already exists. If such a file is found (step 102), then a failure code is returned (step 104). If not, then the proper location for the filename within the directory B-tree is noted (step 106). Using the location information, a file identification number 62 is allocated to the file (step 108). Space on the disk is allocated to the file (step 110) using traditional techniques, as in the NTFS system. A directory entry is created at the appropriate location within the B-tree (step 112), and the directory entry is given the proper filename and file location (step 114) taken from the space allocation step. Data is then written to the allocated space, including in each block the file identification number 62, the sequence numbers 64, the unique bit pattern 66, and the file type 68, as discussed above (step 116). Finally, the B-tree is balanced, if necessary, according to techniques known in the art (step 118), and a success code is returned (step 119).

In one embodiment, the file system allocates disk space in runs, in a similar manner as is used by the NTFS system; namely, the file system keeps a list of free space runs. The file identification numbers 62, file sequence numbers 64, and other information specified by the invention are used to recover data when lost or damaged. Accordingly, allocation runs are stored with the file's directory entry.

Figure 7:
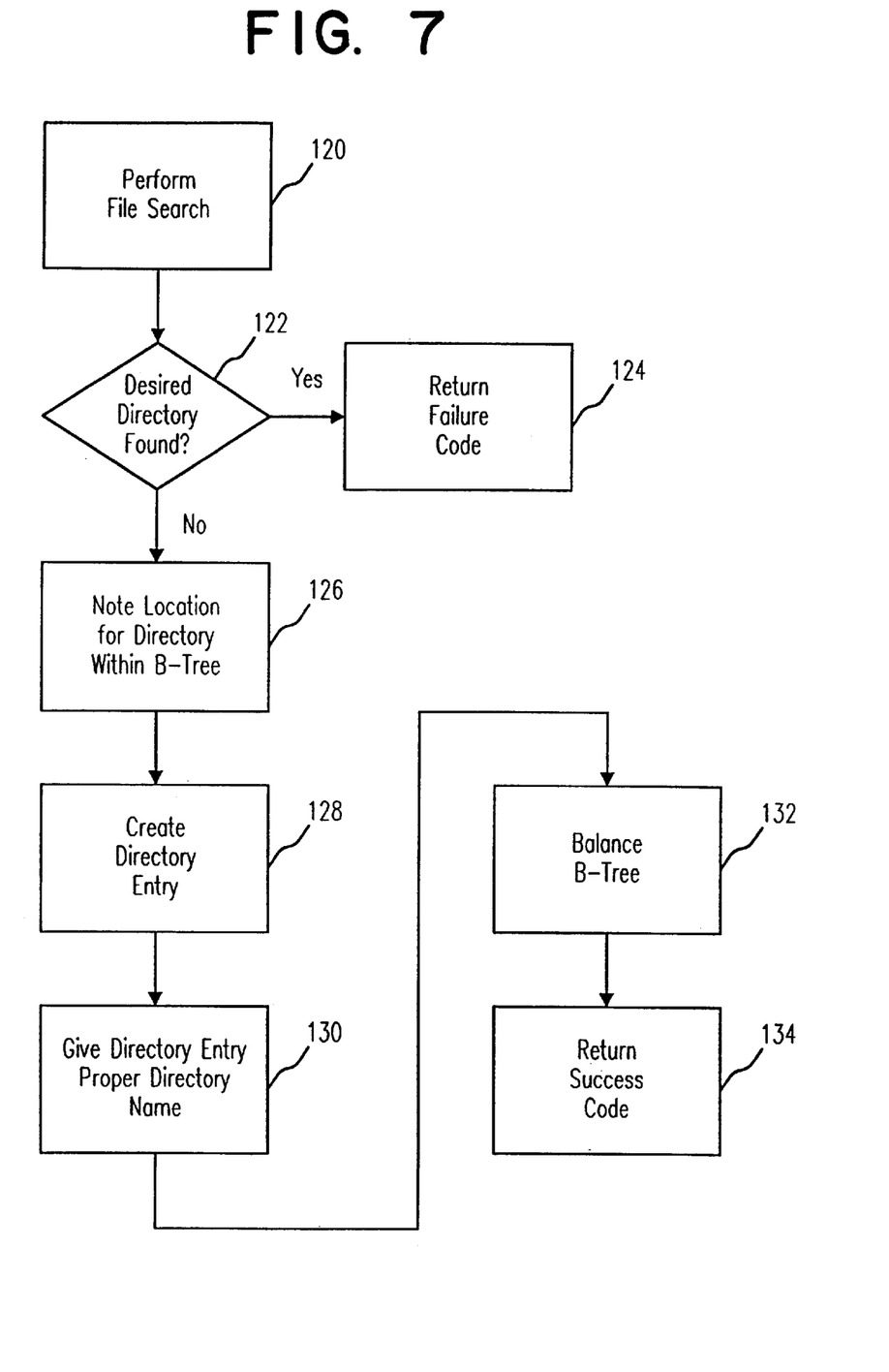
FIG. 7 is a flowchart illustrating the process followed by a directory creation operation according to the present invention.

The creation of a directory is shown in the flowchart of FIG. 7. First, a file search (see FIG. 5) is performed (step 120) to determine if a file or directory having the desired name already exists. If such a file or directory is found (step 122), then a failure code is returned (step 124). If not, then the proper location for the new directory within the directory B-tree is noted (step 126). A directory entry is created at the appropriate location within the B-tree (step 128), and the directory entry is given the proper directory name (step 130). However, no space is allocated, and the directory entry has no block pointer. Finally, the B-tree is balanced, if necessary, according to techniques known in the art (step 132), and a success code is returned (step 134).

Figure 8:
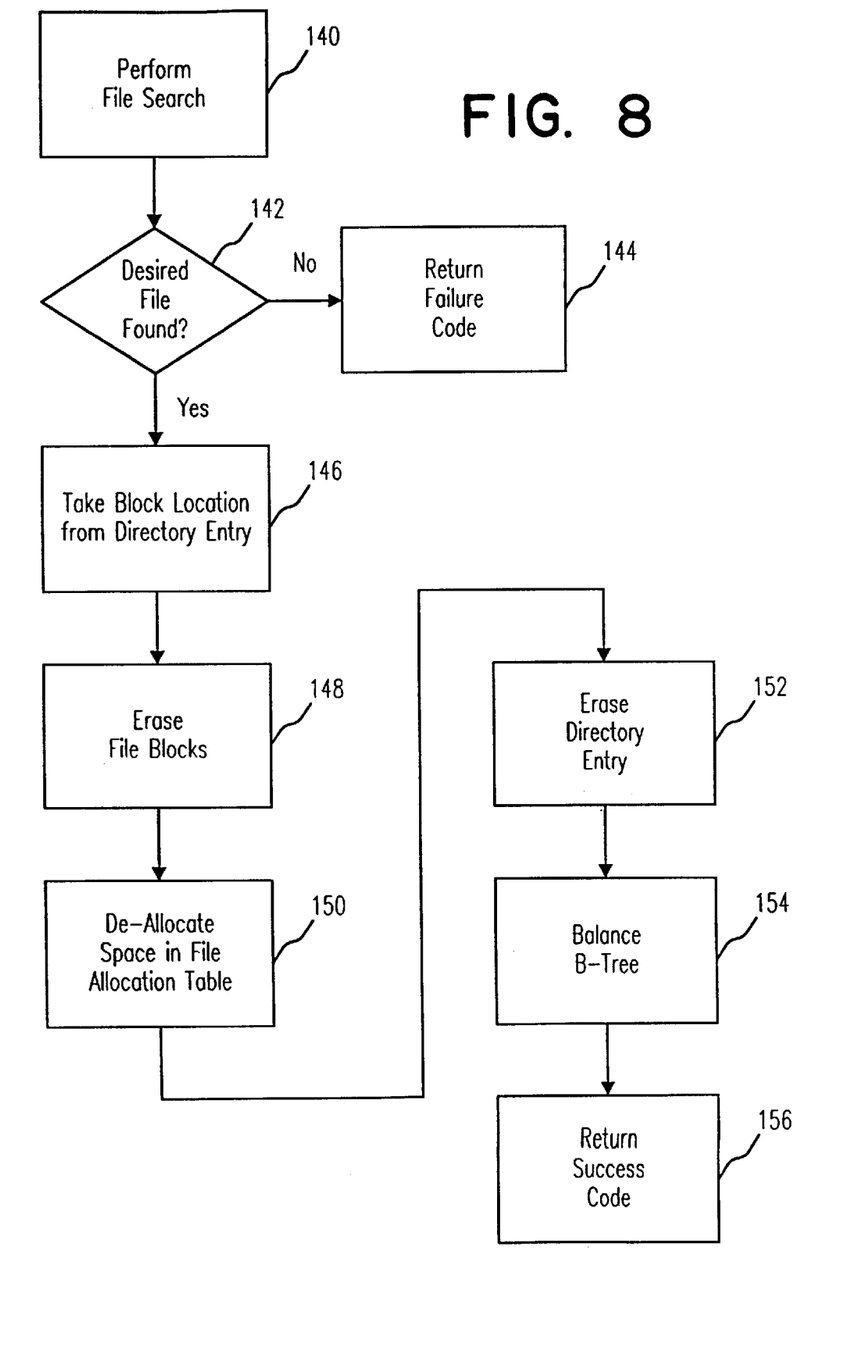
FIG. 8 is a flowchart illustrating the process followed by a file deletion operation according to the present invention.

File deletion is shown in the flowchart of FIG. 8. First, a file search (see FIG. 5) is performed (step 140) to determine if a file having the desired name exists. If such a file is not found (step 142), then a failure code is returned (step 144). If the file is found, then the block location for the file is taken from the directory entry (step 146). Each block belonging to the file is then erased (step 148), or the file identification numbers obliterated, to eliminate the possibility that the file will be improperly recreated if the disk is later scanned for damaged files. The disk space belonging to the file can then be de-allocated in the file allocation table (step 150) by means known in the art. The directory entry within the B-tree is then erased (step 152), freeing the file identification number for later use by a new file. Finally, the B-tree is balanced, if necessary, according to techniques known in the art (step 154), and a success code is returned (step 156).

In an alternative form of file deletion, the file identification numbers are not obliterated, nor are the blocks erased, but a flag in the directory entry and in each data block is set to indicate that the file is no longer present. In this way, the deletion can be "undone" if it was inadvertent.

Figure 9:
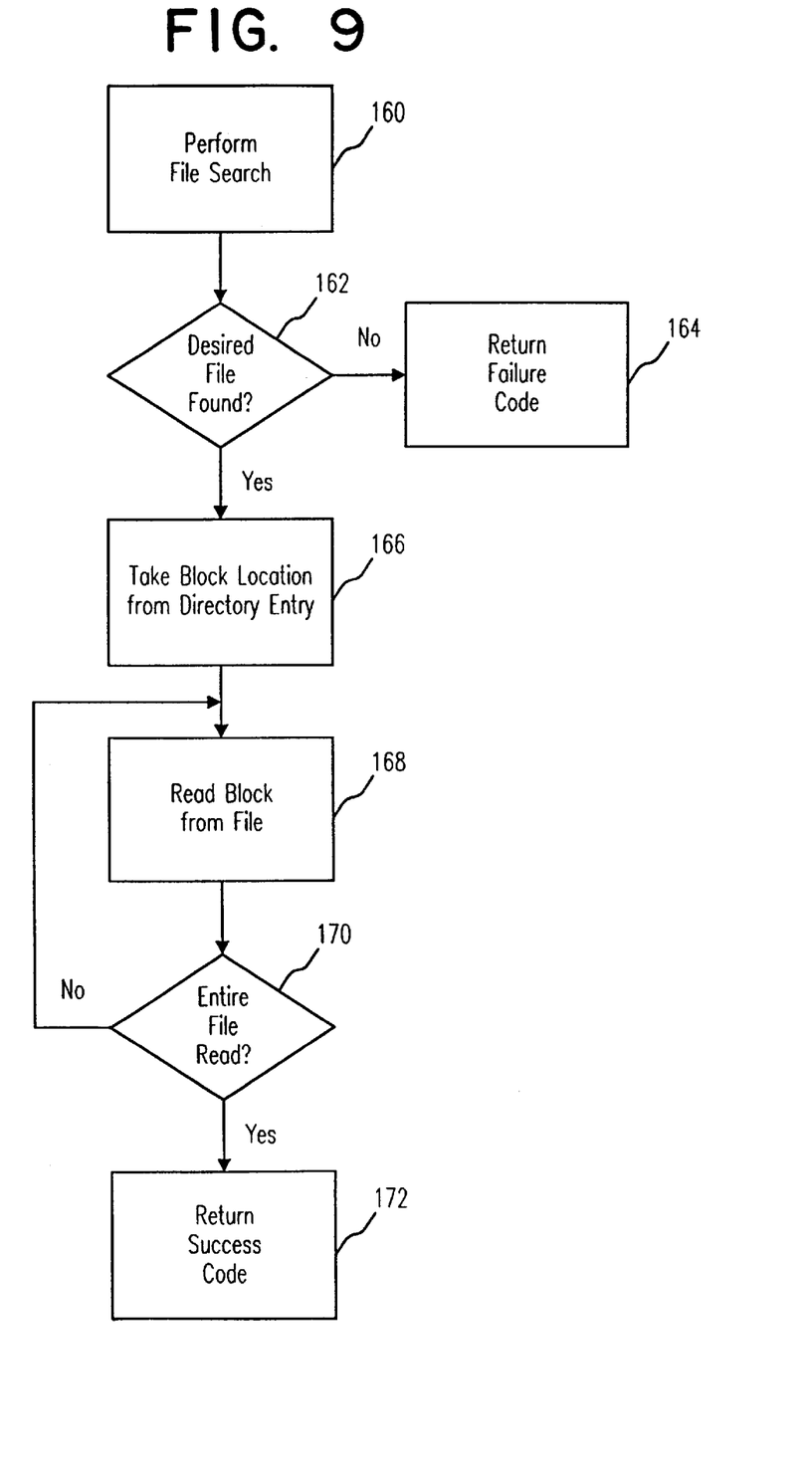
FIG. 9 is a flowchart illustrating the process followed by a file read operation according to the present invention.

The operation of reading a file is shown in the flowchart of FIG. 9. First, a file search (see FIG. 5) is performed (step 160) to determine if a file having the desired name exists. If such a file is not found (step 162), then a failure code is returned (step 164). If the file is found, then the block location for the file is taken from the directory entry (step 166). Then, a block belonging to the file is read (step 168), and the signature area is discarded. If the entire file has not been read (step 170), then the reading process is repeated. If so, a success code is returned (step 172).

It is recognized that similar processes to those described above and shown in FIGS. 6–9 can be used to append to, modify, and truncate a file, with the following observations. When appending to or modifying a file, the same file identification number 62 should be used on the added or changed blocks as is used by the existing file; the proper file sequence numbers 64 should be determined and allocated as necessary. When truncating a file, the file sequence numbers 64 for discarded data blocks should be obliterated, so the discarded blocks are not re-attached when a damage repair operation is performed, as will be discussed below.

The file system of the invention may operate as an independent system, or in conjunction with another file system. Other optional modes of operation are also contemplated.

One such possibility is to use a the file system for real-time backups. A traditional FAT (or other) file system would be used for normal disk reading and writing, while a supervisory program monitors disk operations. If a disk file is written, modified, or deleted on the FAT file system (such as on the disk drive 20, FIG. 1), the supervisory program would take appropriate action to copy, modify, or erase the data on a device embodying the file system of the invention (such as the disk drive 18), by means discussed above. The supervisory program can be enabled to distinguish between critical data (e.g. system files and documents) and non-critical data (e.g. temporary files and other easily recreatable files) so that only the critical files are backed up; this can significantly decrease the space overhead required by the invention.

A second possible mode of operation is to back up files asynchronously (e.g. during idle time or at prespecified intervals). Again, a supervisory program monitors disk operations, tracking those files that have been created or changed on the FAT file system. Then, periodically or during idle time, the supervisory program takes appropriate action to copy, modify, or erase the data on the device embodying the file system, as indicated by the tracking information discussed above.

A third possible mode of operation is for the invention to be implemented within an application program to protect only certain data files. In this embodiment, no separate directory structure is used. The application program, when writing certain data files deemed to be critical, writes the tracking information (e.g. the file identification number 62, the sequence number 64, and the unique bit pattern 66) to each block of the critical files. The application program also performs the reconstruction operation, scanning the block storage device and reconstructing the critical files as necessary. In this embodiment, no operating system intervention is necessary, as the critical data files are generally not accessed by any application other than the one implementing the invention.

Figure 10A:
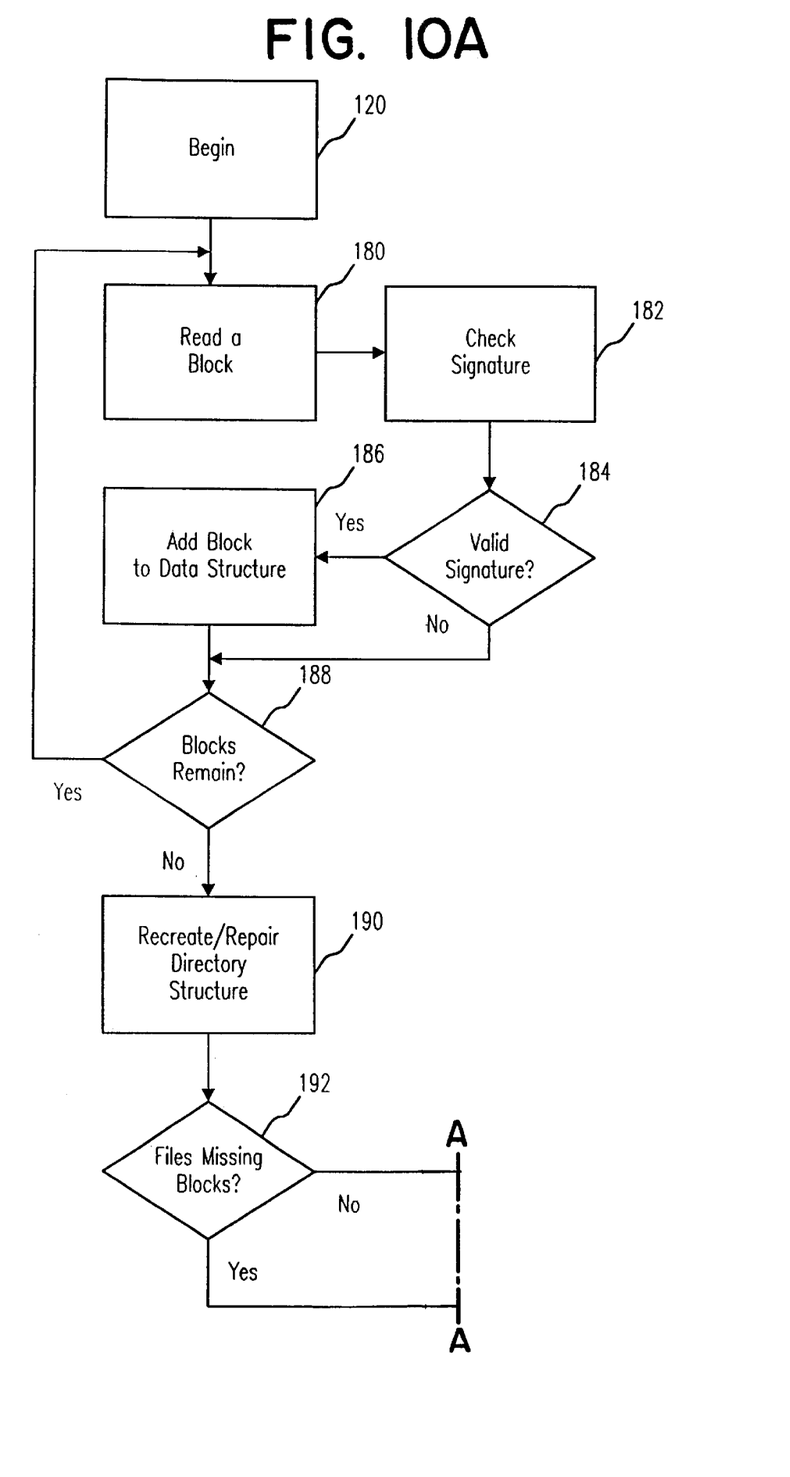
FIGS. 10a and 10b are flowcharts illustrating the process followed by a repair program operating in accordance with the present invention.
Figure 10B:
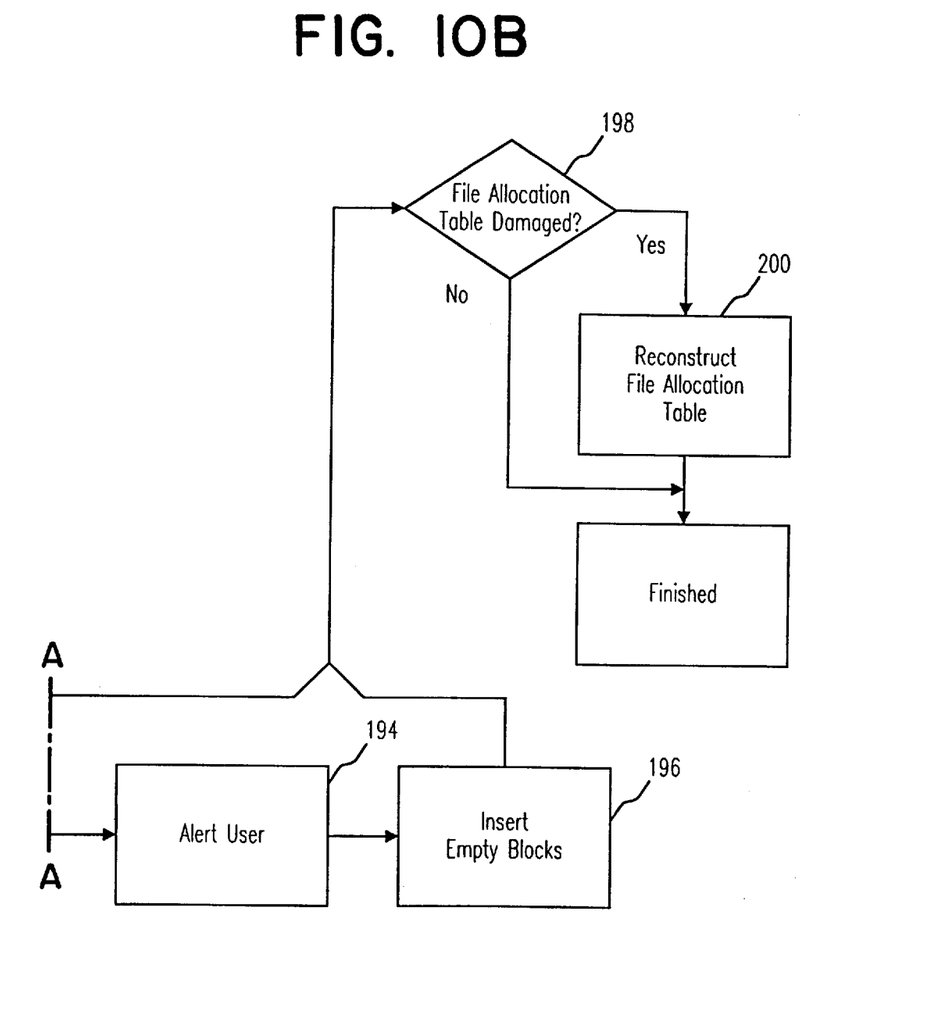

Damage recovery is an important feature of the present invention. Accordingly, if an error is detected by a user (e.g., through a disk error, a program attempting to read invalid data, or a message from a disk diagnostic utility), the user may invoke a repair program. The operation of a repair program according to the present invention is illustrated in FIGS. 10a and 10b.

The repair program operates by scanning the entire block storage device. Each block is read (step 180), and checked for a signature area (step 182). If the signature is valid (step 184), then the block is added to a data structure in memory specifying the existence and location of each data file (step 186). The data structure is preferably a "linked list" of file identification numbers 62, wherein each file identification number 62 has a subsidiary linked list of sequence numbers 64 and corresponding block numbers on the disk.

If any blocks remain (step 188), the process is repeated. If not, the directory structure 32 is recreated or repaired from the information in the foregoing data structures (step 190). If some data files are missing blocks (step 192), then the user is alerted (step 194), and empty blocks are inserted in the appropriate locations (step 196) if the user requests. If the FAT system was in use and the file allocation table was damaged (step 198), then it can be reconstructed from information in the data structures (step 200).

It will be appreciated that embodiments of the present invention may be employed in many different applications to protect valuable data on a block storage device.

What is claimed is:

1. A method for storing a data file comprising at least one data block on a block storage device comprising the steps of:
   generating a unique file identification number for the data file;
   allocating space on the block storage device to the data file;
   designating a signature area for each block of the data file;
   storing a uniquely identifiable bit pattern within the signature area;
   storing the file identification number within the signature area;
   storing each block of the data file, and including therein the corresponding signature area.

2. The method of claim 1, further comprising the step of storing a sequence number for each block within the signature area.

3. The method of claim 2 further comprising the step of storing a checksum within the signature area.

4. The method of claim 1, further comprising the step of searching a directory structure to determine an appropriate location within the directory structure for the file prior to the generating step.

5. The method of claim 4, further comprising the step of making a directory entry at the appropriate location.

6. The method of claim 5, wherein the making step comprises the substeps of:
   allocating a directory entry at the appropriate location;
   writing a pathname to the directory entry; and
   writing a block number corresponding to the allocated space to the directory entry.

7. The method of claim 6, further comprising the step of rebalancing the directory structure.

8. A method for recovering particular data files stored on a block storage device having a directory structure, wherein the particular data files each comprise at least one data block with a signature area including a uniquely identifiable bit pattern, comprising the steps of:
   scanning the block storage device;
   locating a block having a signature area by detecting the uniquely identifiable bit pattern;
   adding information on the location of the block to a data structure; and
   repairing the directory structure.

9. The method of claim 8, wherein the locating and adding steps are repeated for each block on the block storage device.

10. The method of claim 8, wherein:
    the directory structure comprises at least one directory entry; and
    the repairing step comprises the substeps of:
       determining whether a particular data file corresponds to a particular directory entry; and
       creating a directory entry to correspond to the file.

11. The method of claim 8, further comprising the step of repairing the data file.

12. The method of claim 11, wherein:
    each data block has a sequence number; and
    the step of repairing the data files comprises, for each data file, the substeps of:
       creating a list of the data blocks in order of sequence number; and
       for each missing sequence number, inserting an empty block.

13. The method of claim 8, wherein the block storage device has a file allocation table, further comprising the step of recreating the file allocation table.

14. The method of claim 13, wherein the recreating step comprises, for each data block in the data structure, verifying the validity of the file allocation table.

15. A file system for storing files on a block storage device, comprising:
    a central processing unit;
    a data bus;
    a memory subsystem; and
    a block storage device having a plurality of blocks, wherein at least one block has a signature area;
    each signature area containing uniquely identifiable bit pattern.

16. The system of claim 15, wherein the block storage device stores at least one data file.

17. The system of claim 16, wherein the data file encompasses at least one block.

18. The system of claim 16, wherein the block storage device stores a directory structure identifying and locating the data file.

19. The system of claim 18, wherein the directory structure comprises at least one directory entry.

20. The system of claim 19, wherein each directory entry contains a pathname identifying an associated data file, and a block number locating the associated data file on the block storage device.

21. The system of claim 20, wherein the directory structure simulates a hierarchy of directories.

22. The system of claim 19, wherein the directory structure comprises a balanced tree structure.

23. The system of claim 15, wherein the signature area of each block corresponding to the data file contains a file identification number identifying the data file.

24. The system of claim 23, wherein the signature area of each block corresponding to the data file contains a sequence number corresponding to a position of the block within the data file.

25. The system of claim 24, wherein the signature area of each block corresponding to the data file contains a file type code.

26. The system of claim 25, wherein the signature area of each block corresponding to the data file contains a checksum.

27. The system of claim 15, wherein the signature area is included only in data blocks associated with particular data files.

\* \* \* \* \*